United States Patent
Zimerman et al.

(10) Patent No.: US 10,932,085 B1
(45) Date of Patent: *Feb. 23, 2021

(54) CONTENT REQUEST BY LOCATION

(71) Applicant: Snap Inc., Santa Monica, CA (US)

(72) Inventors: Gadi Zimerman, Hod-HaSharon (IL); Ido Sadeh, Ramat-Gan (IL)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/702,166

(22) Filed: Dec. 3, 2019

Related U.S. Application Data

(63) Continuation of application No. 16/134,594, filed on Sep. 18, 2018, now Pat. No. 10,536,800, which is a continuation of application No. 15/712,937, filed on Sep. 22, 2017, now Pat. No. 10,123,167, which is a continuation of application No. 15/371,379, filed on Dec. 7, 2016, now Pat. No. 9,801,018, which is a
(Continued)

(51) Int. Cl.
*H04W 4/021* (2018.01)
*H04W 4/60* (2018.01)
*H04W 4/02* (2018.01)

(52) U.S. Cl.
CPC .......... *H04W 4/021* (2013.01); *H04W 4/023* (2013.01); *H04W 4/60* (2018.02)

(58) Field of Classification Search
CPC ......... H04L 29/08108; H04L 29/08657; H04L 29/08936; H04W 4/02; H04W 64/00
See application file for complete search history.

(56) References Cited

U.S. PATENT DOCUMENTS

| 666,223 A | 1/1901 | Shedlock |
| 4,581,634 A | 4/1986 | Williams |

(Continued)

FOREIGN PATENT DOCUMENTS

| CA | 2887596 A1 | 7/2015 |
| EP | 2051480 A1 | 4/2009 |

(Continued)

OTHER PUBLICATIONS

Xia, Chaolun, et al. "CityBeat: real-time social media visualization of hyper-local city data." Proceedings of the 23rd International Conference on World Wide Web. 2014. (Year: 2014).*
(Continued)

*Primary Examiner* — Sharad Rampuria
(74) *Attorney, Agent, or Firm* — Schwegman Lundberg & Woessner, P.A.

(57) ABSTRACT

A method of obtaining media content of an event, comprising: identifying a real-life event and, a time of said real-life event a geographic location of the real-life event; identifying a subset of a plurality of client terminals of users located in proximity to the geographic location of the real-life event at said time of said real-life event; sending a message to the subset of client terminals containing a request to acquire media content documenting the real-life event; and receiving at least one media content item documenting the real-life event from at least one client terminal of the subset of client terminals, the at least one media content item acquired by at least one user of the users using the at least one client terminal in response to the message.

20 Claims, 4 Drawing Sheets

Related U.S. Application Data continuation of application No. 14/805,489, filed on Jul. 22, 2015, now Pat. No. 9,521,515.

(60) Provisional application No. 62/107,588, filed on Jan. 26, 2015.

(56) References Cited

U.S. PATENT DOCUMENTS

| | | |
|---|---|---|
| 4,975,690 A | 12/1990 | Torres |
| 5,072,412 A | 12/1991 | Henderson, Jr. et al. |
| 5,493,692 A | 2/1996 | Theimer et al. |
| 5,713,073 A | 1/1998 | Warsta |
| 5,754,939 A | 5/1998 | Herz et al. |
| 5,855,008 A | 12/1998 | Goldhaber et al. |
| 5,883,639 A | 3/1999 | Walton et al. |
| 5,999,932 A | 12/1999 | Paul |
| 6,012,098 A | 1/2000 | Bayeh et al. |
| 6,014,090 A | 1/2000 | Rosen et al. |
| 6,029,141 A | 2/2000 | Bezos et al. |
| 6,038,295 A | 3/2000 | Mattes |
| 6,049,711 A | 4/2000 | Yehezkel et al. |
| 6,154,764 A | 11/2000 | Nitta et al. |
| 6,167,435 A | 12/2000 | Druckenmiller et al. |
| 6,204,840 B1 | 3/2001 | Petelycky et al. |
| 6,205,432 B1 | 3/2001 | Gabbard et al. |
| 6,216,141 B1 | 4/2001 | Straub et al. |
| 6,285,381 B1 | 9/2001 | Sawano et al. |
| 6,285,987 B1 | 9/2001 | Roth et al. |
| 6,310,694 B1 | 10/2001 | Okimoto et al. |
| 6,317,789 B1 | 11/2001 | Rakavy et al. |
| 6,334,149 B1 | 12/2001 | Davis, Jr. et al. |
| 6,349,203 B1 | 2/2002 | Asaoka et al. |
| 6,353,170 B1 | 3/2002 | Eyzaguirre et al. |
| 6,401,126 B1 * | 6/2002 | Douceur ............... H04L 29/06 348/E5.008 |
| 6,446,004 B1 | 9/2002 | Cao et al. |
| 6,449,657 B2 | 9/2002 | Stanbach et al. |
| 6,456,852 B2 | 9/2002 | Bar et al. |
| 6,484,196 B1 | 11/2002 | Maurille |
| 6,487,601 B1 | 11/2002 | Hubacher et al. |
| 6,523,008 B1 | 2/2003 | Avrunin |
| 6,542,749 B2 | 4/2003 | Tanaka et al. |
| 6,549,768 B1 | 4/2003 | Fraccaroli |
| 6,618,593 B1 | 9/2003 | Drutman et al. |
| 6,622,174 B1 | 9/2003 | Ukita et al. |
| 6,631,463 B1 | 10/2003 | Floyd et al. |
| 6,636,247 B1 | 10/2003 | Hamzy et al. |
| 6,636,855 B2 | 10/2003 | Holloway et al. |
| 6,643,684 B1 | 11/2003 | Malkin et al. |
| 6,658,095 B1 | 12/2003 | Yoakum et al. |
| 6,665,531 B1 | 12/2003 | Soderbacka et al. |
| 6,668,173 B2 | 12/2003 | Greene |
| 6,684,238 B1 | 1/2004 | Dutta |
| 6,684,257 B1 | 1/2004 | Camut et al. |
| 6,698,020 B1 | 2/2004 | Zigmond et al. |
| 6,700,506 B1 | 3/2004 | Winkler |
| 6,720,860 B1 | 4/2004 | Narayanaswami |
| 6,724,403 B1 | 4/2004 | Santoro et al. |
| 6,757,713 B1 | 6/2004 | Ogilvie et al. |
| 6,832,222 B1 | 12/2004 | Zimowski |
| 6,834,195 B2 | 12/2004 | Brandenberg et al. |
| 6,836,792 B1 | 12/2004 | Chen |
| 6,898,626 B2 | 5/2005 | Ohashi |
| 6,950,623 B2 * | 9/2005 | Brown ............... G06Q 20/108 455/3.01 |
| 6,959,324 B1 | 10/2005 | Kubik et al. |
| 6,970,088 B2 | 11/2005 | Kovach |
| 6,970,907 B1 | 11/2005 | Ullmann et al. |
| 6,980,909 B2 | 12/2005 | Root et al. |
| 6,981,040 B1 | 12/2005 | Konig et al. |
| 7,020,494 B2 | 3/2006 | Spriestersbach et al. |
| 7,027,124 B2 | 4/2006 | Foote et al. |
| 7,072,963 B2 | 7/2006 | Anderson et al. |
| 7,085,571 B2 | 8/2006 | Kalhan et al. |
| 7,110,744 B2 | 9/2006 | Freeny, Jr. |
| 7,124,164 B1 | 10/2006 | Chemtob |
| 7,149,893 B1 | 12/2006 | Leonard et al. |
| 7,173,651 B1 | 2/2007 | Knowles |
| 7,188,143 B2 | 3/2007 | Szeto |
| 7,203,380 B2 | 4/2007 | Chiu et al. |
| 7,206,568 B2 | 4/2007 | Sudit |
| 7,227,937 B1 | 6/2007 | Yoakum et al. |
| 7,237,002 B1 | 6/2007 | Estrada et al. |
| 7,240,089 B2 | 7/2007 | Boudreau |
| 7,269,426 B2 | 9/2007 | Kokkonen et al. |
| 7,280,658 B2 | 10/2007 | Amini et al. |
| 7,315,823 B2 | 1/2008 | Brondrup |
| 7,349,768 B2 | 3/2008 | Bruce et al. |
| 7,356,564 B2 | 4/2008 | Hartselle et al. |
| 7,394,345 B1 | 7/2008 | Ehlinger et al. |
| 7,411,493 B2 | 8/2008 | Smith |
| 7,423,580 B2 | 9/2008 | Markhovsky et al. |
| 7,454,442 B2 | 11/2008 | Cobleigh et al. |
| 7,508,419 B2 | 3/2009 | Toyama et al. |
| 7,512,649 B2 | 3/2009 | Faybishenko et al. |
| 7,519,670 B2 | 4/2009 | Hagale et al. |
| 7,535,890 B2 | 5/2009 | Rojas |
| 7,546,554 B2 | 6/2009 | Chiu et al. |
| 7,607,096 B2 | 10/2009 | Oreizy et al. |
| 7,639,943 B1 | 12/2009 | Kalajan |
| 7,650,231 B2 | 1/2010 | Gadler |
| 7,668,537 B2 | 2/2010 | DeVries |
| 7,770,137 B2 | 8/2010 | Forbes et al. |
| 7,778,973 B2 | 8/2010 | Choi |
| 7,779,444 B2 | 8/2010 | Glad |
| 7,787,886 B2 | 8/2010 | Markhovsky et al. |
| 7,796,946 B2 | 9/2010 | Eisenbach |
| 7,801,954 B2 | 9/2010 | Cadiz et al. |
| 7,856,360 B2 | 12/2010 | Kramer et al. |
| 8,001,204 B2 | 8/2011 | Burtner et al. |
| 8,032,586 B2 | 10/2011 | Challenger et al. |
| 8,082,255 B1 | 12/2011 | Carlson, Jr. et al. |
| 8,090,351 B2 | 1/2012 | Klein |
| 8,098,904 B2 | 1/2012 | Ioffe et al. |
| 8,099,109 B2 | 1/2012 | Altman et al. |
| 8,112,716 B2 | 2/2012 | Kobayashi |
| 8,131,597 B2 | 3/2012 | Hudetz et al. |
| 8,135,166 B2 | 3/2012 | Rhoads |
| 8,136,028 B1 | 3/2012 | Loeb et al. |
| 8,146,001 B1 | 3/2012 | Reese |
| 8,161,115 B2 | 4/2012 | Yamamoto |
| 8,161,417 B1 | 4/2012 | Lee |
| 8,195,203 B1 | 6/2012 | Tseng |
| 8,199,747 B2 | 6/2012 | Rojas et al. |
| 8,208,943 B2 | 6/2012 | Petersen |
| 8,214,443 B2 | 7/2012 | Hamburg |
| 8,234,350 B1 | 7/2012 | Gu et al. |
| 8,276,092 B1 | 9/2012 | Narayanan et al. |
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,379,130 B2 | 2/2013 | Forutanpour et al. |
| 8,385,950 B1 | 2/2013 | Wagner et al. |
| 8,402,097 B2 | 3/2013 | Szeto |
| 8,405,773 B2 | 3/2013 | Hayashi et al. |
| 8,418,067 B2 | 4/2013 | Cheng et al. |
| 8,423,409 B2 | 4/2013 | Rao |
| 8,471,914 B2 | 6/2013 | Sakiyama et al. |
| 8,472,935 B1 | 6/2013 | Fujisaki |
| 8,510,383 B2 | 8/2013 | Hurley et al. |
| 8,527,345 B2 | 9/2013 | Rothschild et al. |
| 8,554,627 B2 | 10/2013 | Svendsen et al. |
| 8,559,980 B2 | 10/2013 | Pujol |
| 8,560,612 B2 | 10/2013 | Kilmer et al. |

(56) References Cited

U.S. PATENT DOCUMENTS

| | | |
|---|---|---|
| 8,594,680 B2 | 11/2013 | Ledlie et al. |
| 8,613,089 B1 | 12/2013 | Holloway et al. |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,350 B2 | 3/2014 | Altman et al. |
| 8,718,333 B2 | 5/2014 | Wolf et al. |
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |
| 8,761,800 B2 | 6/2014 | Kuwahara |
| 8,768,876 B2 | 7/2014 | Shim et al. |
| 8,775,972 B2 | 7/2014 | Spiegel |
| 8,788,680 B1 | 7/2014 | Naik |
| 8,790,187 B2 | 7/2014 | Walker et al. |
| 8,797,415 B2 | 8/2014 | Arnold |
| 8,798,646 B1 | 8/2014 | Wang et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,909,679 B2 | 12/2014 | Root et al. |
| 8,909,725 B1 | 12/2014 | Sehn |
| 8,972,357 B2 | 3/2015 | Shim et al. |
| 8,995,433 B2 | 3/2015 | Rojas |
| 9,015,285 B1 | 4/2015 | Ebsen et al. |
| 9,020,745 B2 | 4/2015 | Johnston et al. |
| 9,040,574 B2 | 5/2015 | Wang et al. |
| 9,055,416 B2 | 6/2015 | Rosen et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,119,027 B2 | 8/2015 | Sharon et al. |
| 9,123,074 B2 | 9/2015 | Jacobs |
| 9,143,382 B2 | 9/2015 | Bhogal et al. |
| 9,143,681 B1 | 9/2015 | Ebsen et al. |
| 9,152,477 B1 | 10/2015 | Campbell et al. |
| 9,191,776 B2 | 11/2015 | Root et al. |
| 9,204,252 B2 | 12/2015 | Root |
| 9,225,897 B1 | 12/2015 | Sehn et al. |
| 9,258,459 B2 | 2/2016 | Hartley |
| 9,344,606 B2 | 5/2016 | Hartley et al. |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | 822016 |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,489,661 B2 | 11/2016 | Evans et al. |
| 9,491,134 B2 | 11/2016 | 1182016 |
| 9,521,515 B2 | 12/2016 | Zimerman et al. |
| 9,532,171 B2 | 12/2016 | Allen et al. |
| 9,537,811 B2 | 1/2017 | Allen et al. |
| 9,628,950 B1 | 1/2017 | 4182017 |
| 9,710,821 B2 | 7/2017 | Heath |
| 9,801,018 B2 | 10/2017 | Zimerman et al. |
| 9,854,219 B2 | 10/2017 | 12262017 |
| 10,123,166 B2 | 11/2018 | Zimerman et al. |
| 10,123,167 B2 | 11/2018 | Zimerman et al. |
| 10,536,800 B1 | 1/2020 | Zimerman et al. |
| 2002/0047868 A1 | 4/2002 | Miyazawa |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | McGrath et al. |
| 2002/0128047 A1 | 9/2002 | Gates |
| 2002/0144154 A1 | 10/2002 | Tomkow |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0148773 A1 | 8/2003 | Spriestersbach et al. |
| 2003/0164856 A1 | 9/2003 | Prager et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson et al. |
| 2005/0223066 A1 | 10/2005 | Buchheit et al. |
| 2005/0288954 A1 | 12/2005 | McCarthy et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2007/0004426 A1 | 1/2007 | Pfleging et al. |
| 2007/0038474 A1 | 2/2007 | Halsted |
| 2007/0038715 A1 | 2/2007 | Collins et al. |
| 2007/0040931 A1 | 2/2007 | Nishizawa |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0136228 A1 | 6/2007 | Petersen |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0281690 A1 | 12/2007 | Altman et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |
| 2008/0055269 A1 | 3/2008 | Lemay et al. |
| 2008/0062141 A1 | 3/2008 | Chandhri |
| 2008/0076505 A1 | 3/2008 | Ngyen et al. |
| 2008/0092233 A1 | 4/2008 | Tian et al. |
| 2008/0094387 A1 | 4/2008 | Chen |
| 2008/0104503 A1 | 5/2008 | Beall et al. |
| 2008/0109844 A1 | 5/2008 | Baldeschweiler et al. |

(56) References Cited

U.S. PATENT DOCUMENTS

| | | |
|---|---|---|
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0214210 A1 | 9/2008 | Rasanen et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0089678 A1 | 4/2009 | Sacco et al. |
| 2009/0089710 A1 | 4/2009 | Wood et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0177299 A1 | 7/2009 | Van De Sluis |
| 2009/0192900 A1 | 7/2009 | Collision |
| 2009/0199242 A1 | 8/2009 | Johnson et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li |
| 2010/0062794 A1 | 3/2010 | Han |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0113065 A1 | 5/2010 | Narayan et al. |
| 2010/0130233 A1 | 5/2010 | Parker |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0281045 A1 | 11/2010 | Dean |
| 2010/0306669 A1 | 12/2010 | Della Pasqua |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1* | 3/2011 | Hurley .................. H04W 4/021 709/231 |
| 2011/0083101 A1 | 4/2011 | Sharon et al. |
| 2011/0102630 A1 | 5/2011 | Rukes |
| 2011/0119133 A1 | 5/2011 | Igelman et al. |
| 2011/0137881 A1 | 6/2011 | Cheng et al. |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238763 A1 | 9/2011 | Shin et al. |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0314419 A1 | 12/2011 | Dunn et al. |
| 2011/0320373 A1 | 12/2011 | Lee et al. |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0150978 A1 | 6/2012 | Monaco |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0172062 A1 | 7/2012 | Altman et al. |

(56) References Cited

U.S. PATENT DOCUMENTS

| | | |
|---|---|---|
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209924 A1 | 8/2012 | Evans et al. |
| 2012/0210244 A1 | 8/2012 | De Francisco Lopez et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0024757 A1 | 1/2013 | Doll et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0145286 A1 | 6/2013 | Feng et al. |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0325964 A1 | 12/2013 | Berberat |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0082651 A1 | 3/2014 | Sharifi |
| 2014/0092130 A1 | 4/2014 | Anderson et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0161316 A1 | 6/2014 | Golan et al. |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0282096 A1 | 9/2014 | Rubinstein et al. |
| 2014/0287779 A1 | 9/2014 | O'keefe et al. |
| 2014/0289833 A1 | 9/2014 | Briceno |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2015/0020086 A1 | 1/2015 | Chen et al. |
| 2015/0046278 A1 | 2/2015 | Pei et al. |
| 2015/0071619 A1 | 3/2015 | Brough |
| 2015/0081207 A1 | 3/2015 | Briant |
| 2015/0087263 A1 | 3/2015 | Branscomb et al. |
| 2015/0088622 A1 | 3/2015 | Ganschow et al. |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0169827 A1 | 6/2015 | Laborde |
| 2015/0172534 A1 | 6/2015 | Miyakawaa et al. |
| 2015/0178260 A1 | 6/2015 | Brunson |
| 2015/0222814 A1 | 8/2015 | Li et al. |
| 2015/0261917 A1 | 9/2015 | Smith |
| 2015/0312184 A1 | 10/2015 | Langholz et al. |
| 2015/0350136 A1 | 12/2015 | Flynn, III et al. |
| 2015/0356101 A1 | 12/2015 | Cohen et al. |
| 2015/0356102 A1 | 12/2015 | Cohen et al. |
| 2015/0356190 A1 | 12/2015 | Rotem et al. |
| 2015/0356191 A1 | 12/2015 | Rotem et al. |
| 2015/0365795 A1 | 12/2015 | Allen et al. |
| 2015/0378502 A1 | 12/2015 | Hu et al. |
| 2016/0006927 A1 | 1/2016 | Sehn |
| 2016/0014063 A1 | 1/2016 | Hogeg et al. |
| 2016/0085773 A1 | 3/2016 | Chang et al. |
| 2016/0085863 A1 | 3/2016 | Allen et al. |
| 2016/0099901 A1 | 4/2016 | Allen et al. |
| 2016/0180887 A1 | 6/2016 | Sehn |
| 2016/0182422 A1 | 6/2016 | Sehn |
| 2016/0182875 A1 | 6/2016 | Sehn |
| 2016/0219402 A1 | 7/2016 | Zimerman et al. |
| 2016/0239248 A1 | 8/2016 | Sehn |
| 2016/0277419 A1 | 9/2016 | Allen et al. |

(56) References Cited

U.S. PATENT DOCUMENTS

| | | |
|---|---|---|
| 2016/0321708 A1 | 11/2016 | Sehn |
| 2017/0006094 A1 | 1/2017 | Abou Mahmoud et al. |
| 2017/0061308 A1 | 3/2017 | Chen et al. |
| 2017/0086021 A1 | 3/2017 | Zimerman et al. |
| 2017/0287006 A1 | 10/2017 | Azmoodeh et al. |
| 2018/0014156 A1 | 1/2018 | Zimerman et al. |
| 2018/0014157 A1 | 1/2018 | Zimerman et al. |

FOREIGN PATENT DOCUMENTS

| | | |
|---|---|---|
| EP | 2151797 A1 | 2/2010 |
| GB | 2399928 A | 9/2004 |
| KR | 19990073076 A | 10/1999 |
| KR | 20010078417 A | 8/2001 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2006118755 A2 | 11/2006 |
| WO | WO-2007092668 A2 | 8/2007 |
| WO | WO-2009043020 A2 | 4/2009 |
| WO | WO-2011040821 A1 | 4/2011 |
| WO | WO-2011119407 A1 | 9/2011 |
| WO | WO-2013008238 A1 | 1/2013 |
| WO | WO-2013045753 A1 | 4/2013 |
| WO | WO-2014006129 A1 | 1/2014 |
| WO | WO-2014068573 A1 | 5/2014 |
| WO | WO-2014115136 A1 | 7/2014 |
| WO | WO-2014194262 A2 | 12/2014 |
| WO | WO-2015192026 A1 | 12/2015 |
| WO | WO-2016044424 A1 | 3/2016 |
| WO | WO-2016054562 A1 | 4/2016 |
| WO | WO-2016065131 A1 | 4/2016 |
| WO | WO-2016100318 A2 | 6/2016 |
| WO | WO-2016100318 A3 | 6/2016 |
| WO | WO-2016100342 A1 | 6/2016 |
| WO | WO-2016149594 A1 | 9/2016 |
| WO | WO-2016179166 A1 | 11/2016 |

OTHER PUBLICATIONS

"A Whole New Story", Snap, Inc., [Online] Retrieved from the Internet: <URL: https://www.snap.com/en-US/news/>, (2017), 13 pgs.

"Adding photos to your listing", eBay, [Online] Retrieved from the Internet: <URL: http://pages.ebay.com/help/sell/pictures.html>, (accessed May 24, 2017), 4 pgs.

"U.S. Appl. No. 14/805,489, Final Office Action dated Jan. 21, 2016", 12 pgs.

"U.S. Appl. No. 14/805,489, Final Office Action dated Feb. 17, 2016", 12 pgs.

"U.S. Appl. No. 14/805,489, Non Final Office Action dated Sep. 25, 2015", 12 pgs.

"U.S. Appl. No. 14/805,489, Notice of Allowance dated Aug. 10, 2016", 9 pgs.

"U.S. Appl. No. 14/805,489, Response filed Jul. 20, 2016 to Final Office Action dated Jan. 21, 2016", 11 pgs.

"U.S. Appl. No. 14/805,489, Response filed Dec. 28, 2015 to Non Final Office Action dated Sep. 25, 2015", 10 pgs.

"U.S. Appl. No. 15/371,379, Notice of Allowance dated Feb. 24, 2017", 12 pgs.

"U.S. Appl. No. 15/371,379, Notice of Allowance dated Jun. 13, 2017", 11 pgs.

"U.S. Appl. No. 15/712,926, Corrected Notice of Allowability dated Jun. 28, 2018", 14 pgs.

"U.S. Appl. No. 15/712,926, Corrected Notice of Allowability dated Jul. 9, 2018", 14 pgs.

"U.S. Appl. No. 15/712,926, Notice of Allowance dated Jun. 8, 2018", 19 pgs.

"U.S. Appl. No. 15/712,926, Notice of Allowance dated Oct. 1, 2018", 17 pgs.

"U.S. Appl. No. 15/712,937, Notice of Allowance dated Jun. 8, 2018", 20 pgs.

"U.S. Appl. No. 15/712,937, Notice of Allowance dated Oct. 1, 2018", 17 pgs.

"U.S. Appl. No. 16/134,594, Notice of Allowance dated Sep. 5, 2019", 9 pgs.

"BlogStomp", StompSoftware, [Online] Retrieved from the Internet: <URL: http://stompsoftware.com/blogstomp>, (accessed May 24, 2017), 12 pgs.

"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.

"Daily App: InstaPlace (iOS/Android): Give Pictures a Sense of Place", TechPP, [Online] Retrieved from the Internet: <URL: http://techpp.com/2013/02/15/instaplace-app-review>, (2013), 13 pgs.

"InstaPlace Photo App Tell the Whole Story", [Online] Retrieved from the Internet: <URL: youtu.be/uF_gFkg1hBM>, (Nov. 8, 2013), 113 pgs., 1:02 min.

"International Application Serial No. PCT/US2015/037251, International Search Report dated Sep. 29, 2015", 2 pgs.

"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.

"Macy's Believe-o-Magic", [Online] Retrieved from the Internet: <URL: https://web.archive.org/web/20190422101854/https://www.youtube.com/watch?v=xvzRXy3J0Z0&feature=youtu.be>, (Nov. 7, 2011), 102 pgs.; 00:51 min.

"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.

"Starbucks Cup Magic", [Online] Retrieved from the Internet: <URL: https://www.youtube.com/watch?v=RWwQXi9RG0w>, (Nov. 8, 2011), 87 pgs.; 00:47 min.

"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.

"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.

Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.

Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.

MacLeod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.

MacLeod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.

Notopoulos, Katie, "A Guide to the New Snapchat Filters and Big Fonts", [Online] Retrieved from the Internet: <URL: https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.

Panzarino, Matthew, "Snapchat Adds Filters, A Replay Function and for Whatever Reason, Time, Temperature and Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.

Tripathi, Rohit, "Watermark Images in PHP and Save File on Server", [Online] Retrieved from the Internet: <URL: http://code.

(56) References Cited

OTHER PUBLICATIONS rohitink.com/2012/12/28/watermark-images-in-php-and-save-file-on-server>, (Dec. 28, 2012), 4 pgs.

U.S. Appl. No. 14/805,489 U.S. Pat. No. 9,521,515, filed Jul. 22, 2015, Content Request by Location.

U.S. Appl. No. 15/371,379 U.S. Pat. No. 9,801,018, filed Dec. 7, 2016, Content Request by Location.

U.S. Appl. No. 15/712,926 U.S. Pat. No. 10,123,166, filed Sep. 22, 2017, Content Request by Location.

U.S. Appl. No. 15/712,937 U.S. Pat. No. 10,123,167, filed Sep. 22, 2017, Content Request by Location.

U.S. Appl. No. 16/134,594 U.S. Pat. No. 10,536,800, filed Sep. 18, 2018, Content Request by Location.

\* cited by examiner

CONTENT REQUEST BY LOCATION

RELATED APPLICATIONS

This application is a continuation of and claims the benefit of priority of U.S. patent application Ser. No. 16/134,594, filed on Sep. 18, 2018, which is a continuation of and claims the benefit of priority of U.S. patent application Ser. No. 15/712,937, filed on Sep. 22, 2017, which is a continuation of U.S. patent application Ser. No. 15/371,379 filed on Dec. 7, 2016, which is a continuation of U.S. patent application Ser. No. 14/805,489 filed on Jul. 22, 2015, now issued as U.S. Pat. No. 9,521,515, which claims the benefit of priority under 35 USC 119(e) of U.S. Provisional Patent Application No. 62/107,588 filed on Jan. 26, 2015, the contents of each being incorporated herein by reference in their entirety.

FIELD AND BACKGROUND OF THE INVENTION

The present invention, in some embodiments thereof, relates to acquiring media content and, more particularly, but not exclusively, to acquiring media content by matching geographic locations of events and users.

People who are interested in media from a real-life event may search this media over the internet, for example in news websites, blogs etc. People may also view media content from an event when such media is posted by others who attended the event, for example in social network platforms. Many of these media content items are created and uploaded by users using mobile devices such as smartphones and/or tablet computers.

SUMMARY OF THE INVENTION

According to an aspect of some embodiments of the present invention, there is provided a method of obtaining media content of an event, comprising: identifying a real-life event, a time of the real-life event and a geographic location of the real-life event; identifying a subset of a plurality of client terminals of users located in proximity to the geographic location of the real-life event at the time of the real-life event; sending a message to the subset of client terminals containing a request to acquire media content documenting the real-life event; and receiving at least one media content item documenting the real-life event from at least one client terminal of the subset of client terminals, the at least one media content item acquired by at least one user of the users using the at least one client terminal in response to the message.

Optionally, the method further comprises: identifying a second subset of the plurality of client terminals of users potentially interested in the real-life event; and automatically providing the at least one media content item to the second subset of client terminals.

More optionally, the providing includes sending a message with a reference to a web document containing the at least one media content item.

Optionally, the method further comprises: providing the at least one media content item to at least one client terminal of the subset of client terminals of users potentially interested in the real-life event.

More optionally, the providing includes sending a message with a reference to a web document containing the at least one media content item.

Optionally, the identifying of the real-life event comprises: receiving a message from a first client terminal of the plurality of client terminals, the message containing a request from a user of the first client terminal to receive a media content documenting the real-life event.

More optionally, the method further comprises: providing the at least one media content item to the first client terminal.

Optionally, the identifying of the real-life event includes identifying a search action of the real-life event by a first client terminal of the plurality of client terminals.

More optionally, the method further comprises: providing the at least one media content item to the first client terminal.

Optionally, the identifying of the real-life event includes using an automatic algorithm connected to at least one events source.

Optionally, the identifying of the real-life event is done manually by entering event details into an event dataset.

Optionally, the method further comprises: sending a message with a reference to a web document containing the at least one media content item to at least one client terminal of the plurality of client terminals.

Optionally, the method further comprises: providing the at least one media content item to at least one third party to be presented by the third party in relation to the real-life event.

Optionally, the identifying of the subset of client terminals comprises: monitoring geographic locations of the plurality of client terminals; and automatically identifying when at least one of the plurality of client terminals is located in proximity to the geographic location of the real-life event.

Optionally, the identifying of the subset of client terminals includes accessing at least one calendar stored in a memory of at least one of the plurality of client terminals.

Optionally, the identifying includes ranking of the subset of client terminals according to past media content items received from each of the plurality of client terminals.

Optionally, the message includes instructions for acquiring the media content item.

Optionally, the message includes coordinates of the geographic location of the real-life event to be included in a map that indicates the geographic location and presented on a screen of each of the subset of client terminals.

Optionally, the message includes text instructions to arrive at a geographic location and/or coordinates of the geographic location of the real-life event to be included in a map that indicates the geographic location. The text instructions and the map are presented on a screen of each of the subset of client terminals.

More optionally, the map includes multiple identified geographic locations of real-life events.

Optionally, the message includes instructions for connecting the media content item to the real-life event.

Optionally, the at least one media content item is received by a message with a reference to a web document containing the at least one media content item.

Optionally, the at least one user is credited for acquiring the at least one media content item.

Optionally, the at least one media content item is aggregated with other media content items.

According to some embodiments of the invention, there is provided a computer readable medium comprising computer executable instructions adapted to perform the method.

According to an aspect of some embodiments of the present invention, there is provided a system for obtaining media content of an event, comprising: an event module that identifies a real-life event, a time of the real-life event and a geographic location of the real-life event; a tracking module that identifies a subset of a plurality of client terminals of users located in proximity to the geographic location of the real-life event at the time of the real-life event; and a communication module that: sends a message to the subset of client terminals containing a request to acquire media content documenting the real-life event; and receives at least one media content item documenting the real-life event from at least one client terminal of the subset of client terminals, the at least one media content item acquired by at least one user of the users using the at least one client terminal in response to the message.

Optionally, the method further comprises: an event dataset for storing the real-life event, the time of the real-life event and the geographic location of the real-life event.

Optionally, the method further comprises: a media dataset for storing the at least one media content item.

Optionally, the method further comprises: an aggregation module that aggregates the media content item with other media content items.

Optionally, the event module receives event details from an event algorithm that analyzes information from at least one events source.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
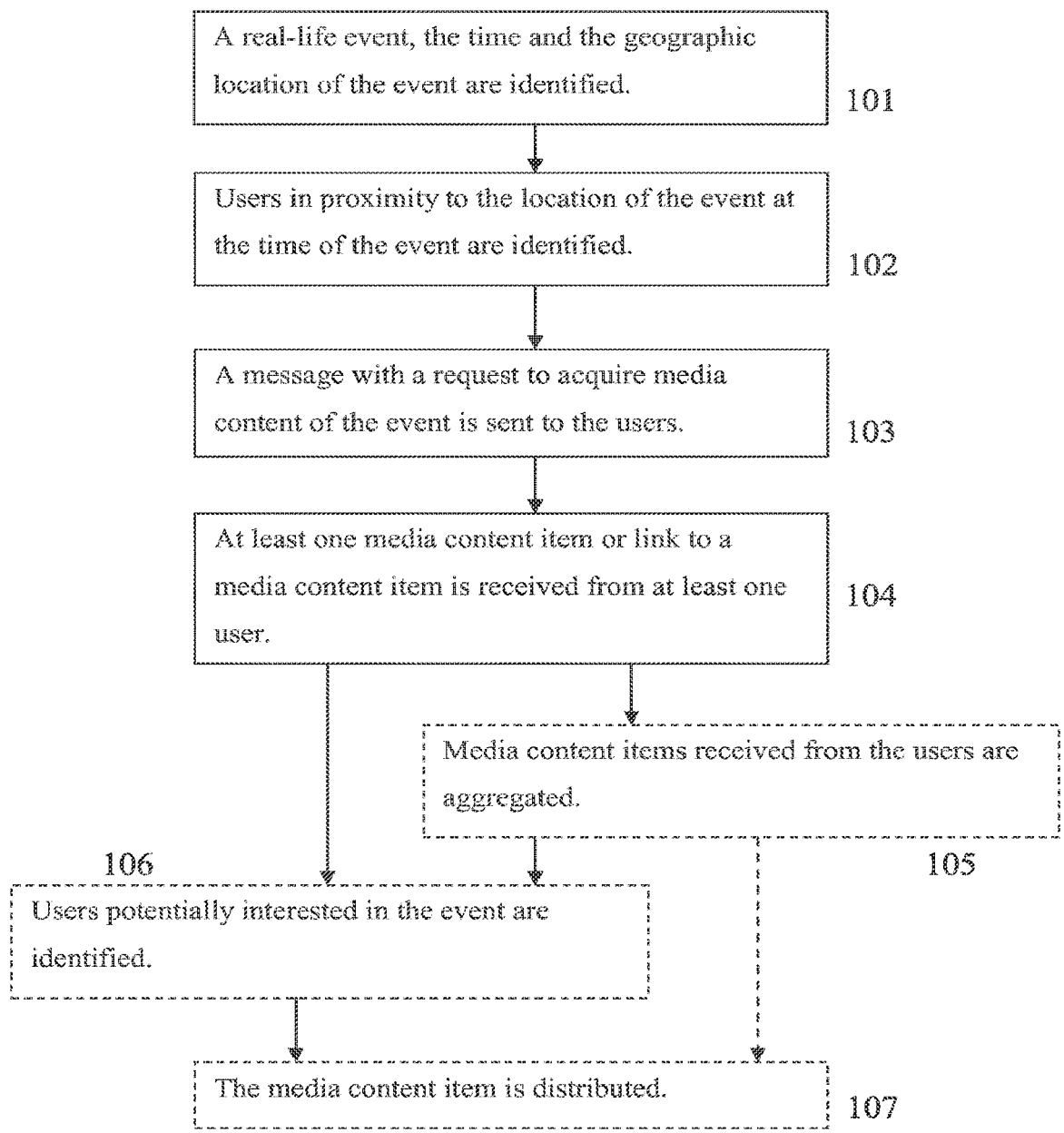
FIG. 1 is a flowchart schematically representing a method for obtaining media content documenting an event by requesting a user located in proximity to the event at the time of the event to acquire the media, according to some embodiments of the present invention.

The present invention, in some embodiments thereof, relates to acquiring media content and, more particularly, but not exclusively, to acquiring media content by matching geographic locations of events and users.

According to some embodiments of the present invention, there are provided methods and systems for acquiring media content, such as images, videos, voice recordings and/or text, documenting a real-life event such as a concert, a sport game or a demonstration, by requesting users who are in proximity to the event at the time of the event, to acquire the media content.

When the method is applied, a real-life event and geographic location are identified. This is done either by receiving requests from users interested in the event, automatically by an algorithm that scans multiple sources and/or manually. Client terminals of users in proximity to the geographic location of the event at the time of the event are identified, for example by a global positioning system (GPS) device of the client terminals. A message is then sent to the client terminals, containing a request to acquire media content documenting the event. The user may then respond by acquiring a media content item, for example take a photo of the event using the camera of his mobile phone, and upload it to the system. The media content items acquired by the users of the client terminals are then received by the system.

Optionally, the media content is then distributed, for example sent to the users who requested for the media content, sent to other users potentially interested in the event, posted online as part of other content relating to the event and/or provided to third parties.

The method allows users to act as momentary reporters and provide media content from their position, for example current position, knowing that their media content is requested, and may be viewed by multiple people and not just their friends. The method has the advantage of receiving media content in real-time, from events that may be unpredicted, remote and/or too obscure to send a reporter. Also, the method allows users to request media from events they are interested in. The media content documenting an event may be received from multiple users, therefore having the advantages of multi-perspective coverage of the event.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk. C++ or the like, and conventional procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN) or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
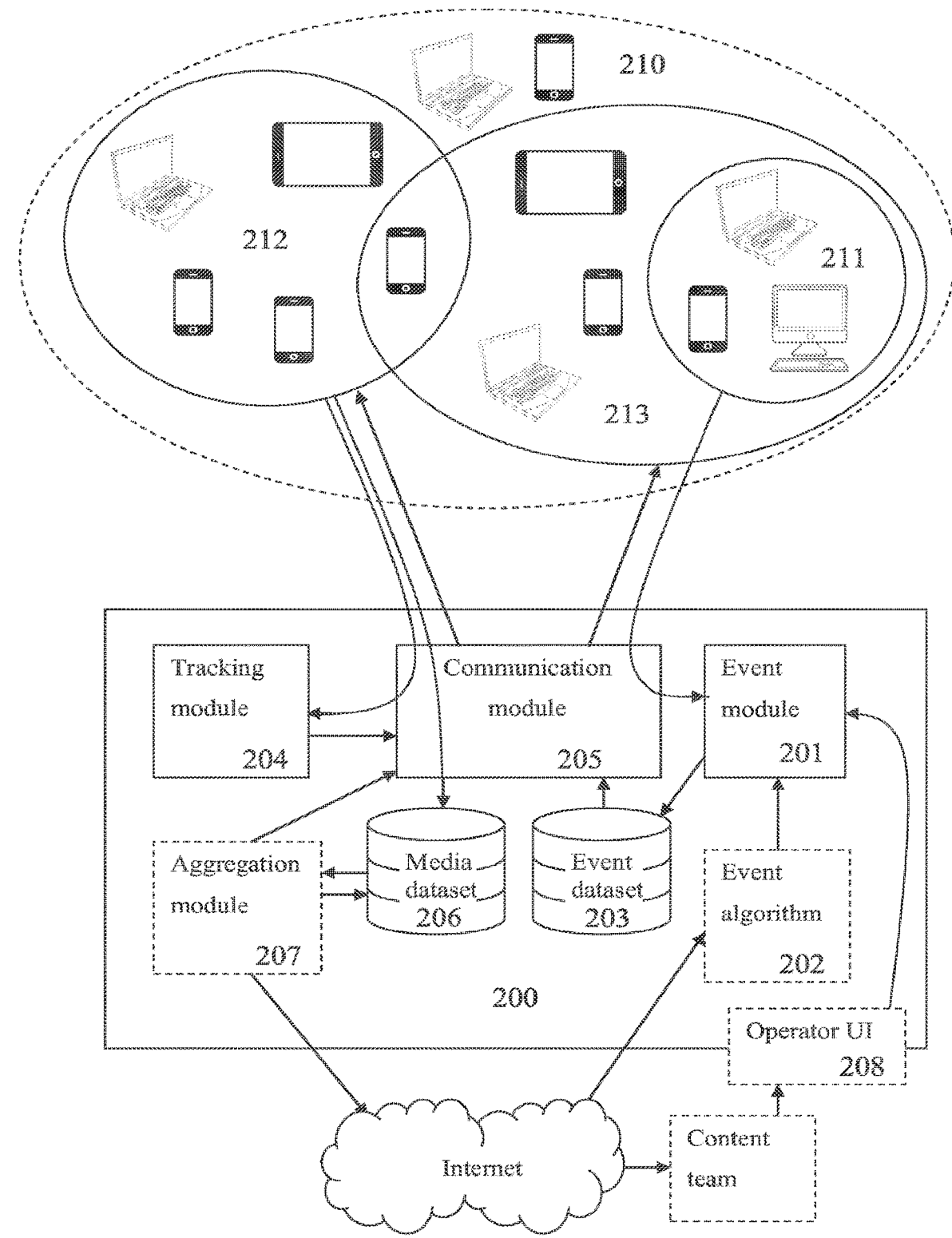
FIG. 2 is a schematic illustration of a system for obtaining media content documenting an event by requesting a user located in proximity to the event at the time of the event to acquire the media, according to some embodiments of the present invention.

Referring now to the drawings. FIG. 1 is a flowchart schematically representing a method of obtaining media content documenting an event by requesting a user located in proximity to the event at the time of the event to acquire the media, according to some embodiments of the present invention. Reference is also made to FIG. 2, which is a schematic illustration of a system of obtaining media content documenting an event by requesting a user located in proximity to the event at the time of the event to acquire the media, according to some embodiments of the present invention.

System 200 may include one or more computing devices, for example, a mainframe computer, an enterprise server, a workstation, multiple connected computers and/or a personal computer.

System 200 is connected via a network to multiple client terminals 210, each used by a user. The network may include, for example, local area network (WLAN), a wireless network such as mobile network, wireless local area network (WLAN) such as Wireless Fidelity (WiFi™), a wireless personal area network (WPAN) such as Bluetooth™ protocol and/or any other network.

Client terminals 210 may include, for example, a mobile device such as a Smartphone, a tablet, a wearable device such as Google glass, a Smart watch, a laptop computer and/or the like, a personal computer and/or any device that has one or more network communication modules, such as a network card or chip and runs a web-browser.

Each client terminal may include a program such as an App Store application or a Google Play application installed in the client terminal, a native operating system application and/or a browser add-on.

First, as shown in 101, a real-life event, the time of the event and the geographic location of the event are identified by an event module 201. The time of the event may be the current time for currently occurring events or may be a future time, for future events.

The real-life event may be, for example, a multi participant event such as a concert, a demonstration, a conference, and/or a sport game, a natural event such as a weather phenomena and/or an eclipse, and/or any other occasion or incident. The real-life event may also be general, for example, a city during a time period of a few months. The real-life event may be scheduled in advance or occurring as an outcome of circumstances, for instance a terror attack and/or a gathering of people induced by a presence of a celebrity, an artist and/or the like. For brevity, a real-life event may be referred to herein as an event.

Optionally, the event identification is done by receiving requests from a subset of client terminals 211 of client terminals 210 of users interested in receiving media content form the event. A user of one of client terminals 211 may perform a search for the event and/or may actively request for media content to be acquired. For example, a user is interested in seeing photos of a concert currently taking place. The request may include specific instruction, locations and/or items in the event. For example: "Please show the crowd roar after a goal in the game in Old Trafford". The request may be for a current event or for a future event. Optionally, the request may be a search action of the event by a user of one of client terminals 210. The search action may include, for example, the name of the event, the date or time of the event and/or any other detail related to the event.

Optionally, the request is indicative of specific information that should be included in the media content. Optionally, the specific information is of interest to a specific user of one of client terminals 211, for example to provide an answer to a specific question. For example, a request for an image of a nightclub or a queue to the post office, to indicate whether the place is currently crowded.

Optionally, a user who accesses a web document, such as a webpage displaying an article, an image, or a video (e.g. file or stream) about a held or a currently held event, is presented with a graphical user interface (GUI) that allows him to request for media content relating to the event. Optionally, a request is received from an agent of a third party such as a news agency and/or a media company, for example via an application programming interface (API).

Optionally, the event identification is done by an automatic event algorithm 202. Automatic event algorithm 202 may use any source of information available on the internet and/or specialized sources, for example, databases of events, rich site summary (RSS), news websites, user-generated content such as social networks, forums and/or blogs, search engines, official websites (such as of bands and/or sport leagues) and/or any other source. Optionally, the event identification is done as described in US Provisional Patent Application No. 62/007,974, filed on Jun. 5, 2014 which is incorporated here by reference.

Optionally, the event identification is done by manually providing events and their geographic location to event module 201, for example via an operator user interface (UI) 208. This may be performed, for example, by employees of a content team using operator UI 208. Content team may use any source of information as described above.

Optionally, an event is identified when potential use of media content documenting the event is identified, for example when the event is mentioned in news articles, event feeds, social media posts, chats and/or any combination thereof.

Optionally, an event is identified only after indication of interest from several sources, for example, multiple requests from client terminals 211, a request from one of client terminals 211 and also mentions in social networks and/or several mentions in news reports. For example, an event is not identified when media content documenting the event is requested by one user, however, when the event is also mentioned in a news website, the event is identified.

Events identified by event module 201 may be stored in an event dataset 203.

Event dataset 203 may be any kind of structured data collection that allows access to stored data. Event dataset 203 may be stored, for example, in a digital data storage unit such as a magnetic drive and/or a solid state drive. Optionally, entries of events stored in event dataset 203 may be processed, for example by a merge algorithm that merges entries that were created as separate events but actually indicative of the same event.

Then, as shown in 102, a subset 212 of client terminals 210, which are used by users currently located in proximity to the geographic location of the event at the time of the event, is identified by a tracking module 204.

Optionally, client terminals 212 are identified by monitoring the geographic location of client terminals 210. The geographic location may be determined, for example, by a positioning system included in each of client terminals 210 such as global positioning system (GPS), triangulation of cellular network, Wireless Fidelity (WiFi™) network and/or any other locating method.

Optionally, users of client terminals 212 are ranked according to past uploads of media content. Optionally, users are identified as having better potential to respond to the request, for example, users who responded to requests in the past and/or uploaded media content to social networks are identified and ranked high. Optionally, users are identified as having better potential to produce quality uploads, for example according to quality of past uploads.

Optionally, users who are expected to be in proximity to the geographic location of the event at the time of the event are identified prior to the event, for example, by connecting to calendars stored on client terminals 210 and identifying future calendar events that are in geographic proximity and time proximity to the event.

Then, as shown in 103, a message is sent by a communication module 205 to client terminals 212. The message contains a request to acquire media content documenting the event. The message may be sent prior to the event and/or during the time of the event.

Communication module 205 may be, for example, a hardware element such as a network adapter card and/or a software module such as a computer program.

The media content may include, for example, images, videos, voice recordings, text and/or any other media. The message may be sent, for example, via a messaging service of an application installed on each of client terminals 212, mobile notification of the application, via short message service (SMS), an instant messaging (IM), an email and/or by any other communication method. The message may include specific instructions for acquiring the media content, for example, as indicated in the requests sent from client terminals 211 and/or according to other existing media content. For example, when most existing videos are taken from one angle, users are asked to take videos from a different angle.

Optionally, a map or textual instructions segment is presented in client terminals 212 to indicate the geographic location of the event. The textual instructions may be calculated automatically from map data, navigation application or API and/or taken from a database. The coordinates of said geographic location may be included in the message. Optionally, the message contains a request that includes instructions for locating the event, for example: "There is a demonstration 400 m north of your location. Please show us what's going on". Optionally, the map includes multiple geographic locations of events for which media content is required.

Optionally, a chat is automatically established between the requestors and the user(s) who accept the request. For example, the chat is established as a group chat of an instant messaging platform and/or as an in application chat that is managed using a chat GUI as known in the art. This allows requestor to personally react to the uploaded content, optionally in real time, for example during a live feed of the content and/or immediately after the content is uploaded.

Then, as shown in 104, at least one media content item is received from at least one client terminal of client terminals 212 in response to the request message.

The media content item documenting the event and acquired by the user of the client terminal. The media content item may be acquired, for example, by sensors included in client terminals 212 such as built-in camera and/or recorder and/or by any other equipment. Optionally, media content items may be acquired by one device, such as a digital single-lens reflex camera (DSLR) and uploaded by a second device, such as a personal computer. Optionally, the media content item is received as a link to media content item uploaded to the internet, for example posted in a social network and/or personal blog.

Optionally, instructions are sent to users of client terminals 212 on how to connect the media content item to the right event, for example including suggested hash-tag(s) that could be used by a user to tag the media content item.

Optionally, media content items received from client terminals 212 are stored in a media dataset 206. Media dataset 206 may be any kind of structured data collection, as described above.

Then, optionally, as shown in 105, media content items received from client terminals 212 are aggregated by aggregation module 207. For example, a few images from the event are clustered, combined to create a collage, sorted to create a timeline of the event, sorted according to subject documented in the media items (for example artist, crowd, stage etc) and/or processed in any other way.

Then, optionally, as shown in 106, a subset 213 of client terminals 210, which are used by users potentially interested in the event, is identified. Client terminals 213 may include client terminals 211 of users that requested media content documenting the event and/or one or more of client terminals 212 which are in proximity to the event at the time of the event and may be interested in watching the event from a different angle or different interpretation. Optionally, client terminals 213 may also include one or more of client terminals 210 that are selected according to use patterns and are identified by an algorithm to identify users that were interested in this type of event in the past, for example according to visited websites, past requests, interests indicated by users for example in a configuration options and/or by any other method.

Then, optionally, as shown in 107, the media content is distributed by communication module 205, for example by messages. Optionally, the media content item is provided to client terminals 213 by a message which is sent by communication module 205 to client terminals 213, containing the media content item. The message may be any kind of message, as described above. Optionally, the media content item is provided by a message which contains a reference to a web document containing the media content. The web document that may be, for example, a webpage, an extensible markup language (XML) page, a hypertext markup language (HTML) page, a portable document format (PDF), an executable, an email, an audio and/or video file, an image and/or any other network accessible content file. The web document may be a webpage or any other network accessible destination. The web document may include, for example, a visual container that allows users to explore all the media content from the event. The reference to the web document may be, for example, a Uniform Resource Locator (URL) or a Universal Resource Identifier (URI). Optionally, the media content is distributed by an algorithm, for example an auto-article enrichment algorithm such as described in U.S. Provisional Patent Application No. 62/007,974. Optionally, a suggestion is sent to users of client terminals 213 to subscribe to media content documenting the event, for example by a hash-tag.

Optionally, the media content is distributed to third parties such as Media companies and/or news agencies. This may be implemented in a revenue share model. Optionally, payment is received from the third parties. Optionally, third parties are provided with access to media dataset 206, for example via an application programming interface (API).

Optionally, users are credited for uploading media content when requested.

For example, highly credited users are the first to receive media content documenting events and/or get priority when requesting media content. Optionally, users are paid when media content which they uploaded is sold to a third party.

Optionally, users are credited when media content which they uploaded is viewed, acknowledged and/or shared by others. Optionally, users are credited for accurately acquiring media content based on specific requests, for example, a show from a specific angle. Optionally, users requesting media content may initiate bidding for providing the required media content.

Optionally, the frequency of distributing the media content is adjusted, for example based on time, geographic location, other events and/or any other factor. For example, notifications to client terminals 213 may be frequent during the time of the event and less frequent when the event is over.

Optionally, the media content is distributed while new media is uploaded by client terminals 212 and is continuously aggregated by aggregation module 207.

Figure 3:
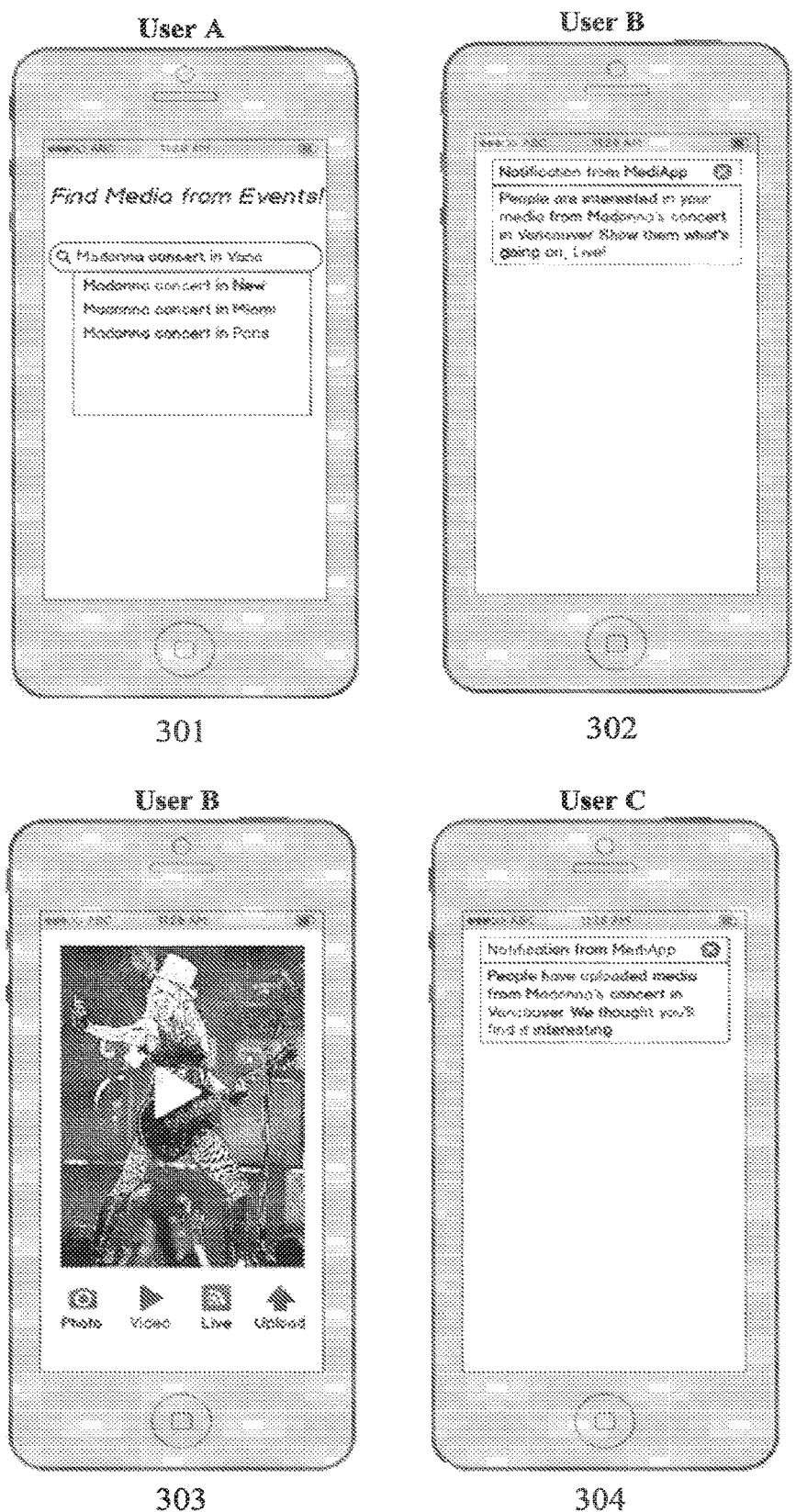
FIG. 3 is an exemplary application user interface (UI) of an application of obtaining media content documenting an event, according to some embodiments of the present invention.
Figure 4:
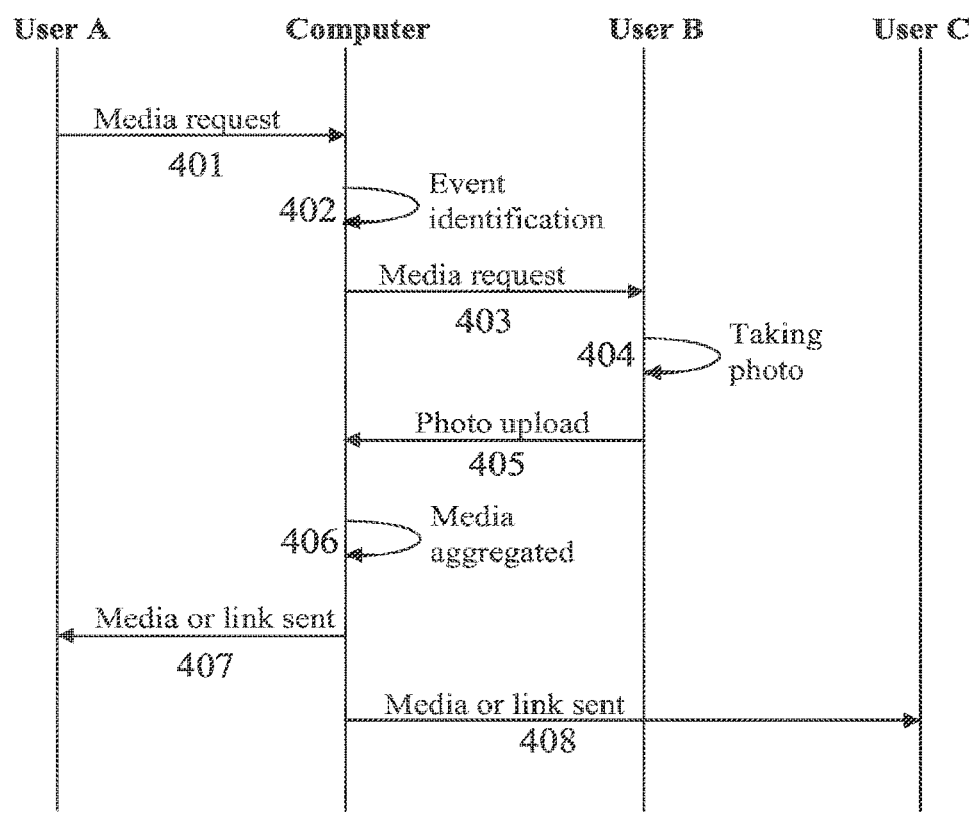
FIG. 4 is a sequence chart schematically representing an exemplary scenario of obtaining media content documenting an event, according to some embodiments of the present invention.

Reference is now made to FIG. 3, which is an exemplary application user interlace (UI) of an application of obtaining media content documenting an event, according to some embodiments of the present invention. Reference is also made to FIG. 4, which is a sequence chart schematically representing an exemplary scenario of obtaining media content documenting an event, according to some embodiments of the present invention.

First, as shown in 301 and in 401, a user A of group 211 of the application is searching for media from the Madonna concert which is about to start in Vancouver, the system may suggest other popular searches from Madonna (such as from the last days). Since the concert has not started yet, very few (if any) media items are available.

Then, as shown in 402, the system then identifies that the Madonna concert in Vancouver is an interesting event, as a substantial number of users are querying on it.

The system identifies the time of the concert and which venue holds the concert, for example by using internet sources, and identifies the cellular polygonal perimeter that holds the venue.

Then, as shown in 403, the system sends a notification to users of group 212, which are within the polygonal perimeter, such as shown in 302 which is a screenshot of the application of user B of group 212, which invites people to share what they are viewing right now.

Then, as shown in 404. User B of group 212 takes a photo of Madonna in the concert. As shown in 303, the application allows for a quick upload screen for different type of media.

Then, as shown in 405, user B of group 212 uploads the photo of Madonna to the server of the system. Once the image is uploaded, it is aggregated together with other media uploaded from the Madonna concert in Vancouver, as shown in 406.

Finally, when enough media is gathered from users at the Madonna concert in Vancouver, a notification is send to users who have shown interest in that event (and others), such as user C of group 213 as shown in 304 and 407, and/or such as user A of group 211 who requested for the media, as shown in 408.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application, many relevant methods and systems for acquiring media content will be developed and the scope of the term media content is intended to include all such new technologies a priori.

The terms "comprises", "comprising", "includes", "including", "having" and their conjugates mean "including but not limited to". This term encompasses the terms "consisting of" and "consisting essentially of".

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of obtaining media content of an event, comprising:

identifying a first subset of a plurality of client terminals of a plurality of users, client terminals of the first subset being located in proximity to a geographic location of a real-life event at a time of the real-life event;

identifying a second subset of the plurality of client terminals associated with users potentially interested in the real-life event;

sending a message to each client terminal of the first subset of client terminals, the message containing a request, to present on a respective display of the client terminal, to acquire media content documenting the real-life event in the geographic location, the request comprising instructions for imaging the real-life event; and in response to a given client terminal of the first subset of client terminals accepting the request, establishing a chat between the given client terminal and at least one client terminal of the second subset of client terminals.

2. The method of claim 1, further comprising:

receiving, from a first client terminal of the first subset of client terminals, a media content item in response to the message, the media content item being acquired by the first client terminal and the media content item documenting the real-life event; and distributing the media content item to a second client terminal of the second subset of client terminals.

3. The method of claim 2, further comprising distributing the media content item to the second client terminal while the media content item is being received from the first client terminal.

4. The method of claim 2, wherein the distributing occurring at a frequency determined based on at least one of the time and the geographic location of the real-life event.

5. The method of claim 2, wherein the distributing comprises:

providing the media content item to the second client terminal, the providing comprising sending a message with a reference to a network-accessible content file containing the media content item.

6. The method of claim 2, further comprising:

distributing the media content item to at least one third party to be presented by the at least one third party in relation to the real-life event.

7. The method of claim 2, wherein the media content item is received by a message with a reference to a network-accessible content file containing the media content item.

8. The method of claim 2, wherein the media content item is aggregated with other media content items.

9. The method of claim 1, wherein the geographic location of the real-life event is identified using a search action that comprises searching at least one events source which is external to the plurality of client terminals.

10. The method of claim 1, wherein the geographic location of the real-life event is manually provided by a user entering event details into an event dataset.

11. The method of claim 1, wherein the identifying the first subset of client terminals comprises:

monitoring geographic locations of the plurality of client terminals, the identifying being performed in response to at least one of the plurality of client terminals being located in proximity to the geographic location of the real-life event.

12. The method of claim 1, wherein the identifying the first subset of client terminals comprises accessing at least one calendar stored in a memory of at least one of the plurality of client terminals.

13. The method of claim 1, wherein the identifying comprises ranking of the first subset of client terminals according to past media content items received from each of the first subset of client terminals.

14. The method of claim 1, wherein the instructions comprise at least one text instruction to arrive at the geographic location, and coordinates of the geographic location of the real-life event to be included in a map that indicates the geographic location, and wherein the at least one text instruction and the map are presented on a screen of each of the first subset of client terminals.

15. The method of claim 14, wherein the map comprises multiple identified geographic locations of real-life events.

16. A system of obtaining media content of an event, comprising:

at least one network interface;

a memory storing a code; and a processor coupled to the memory and the at least one network interface for executing the code, the code causing the processor to perform operations comprising:

identifying a first subset of a plurality of client terminals of a plurality of users, client terminals of the first subset being located in proximity to a geographic location of a real-life event at a time of the real-life event;

identifying a second subset of the plurality of client terminals associated with users potentially interested in the real-life event;

sending a message to each client terminal of the first subset of client terminals, the message containing a request, to present on a respective display of the client terminal, to acquire media content documenting the real-life event in the geographic location, the request comprising instructions for imaging the real-life event; and in response to a given client terminal of the first subset of client terminals accepting the request, establishing a chat between the given client terminal and at least one client terminal of the second subset of client terminals.

17. The system of claim 16, wherein the operations further comprise:

receiving, from a first client terminal of the first subset of client terminals, a media content item in response to the message, the media content item being acquired by the first client terminal and the media content item documenting the real-life event; and distributing the media content item to a second client terminal of the second subset of client terminals.

18. The system of claim 17, further comprises distributing the media content item to the second client terminal while the media content item is being received from the first client terminal.

19. The system of claim 17, wherein the distributing occurring at a frequency determined based on at least one of the time and the geographic location of the real-life event.

20. A non-transitory computer readable medium comprising computer executable instructions adapted to perform operations comprising:
- identifying a first subset of a plurality of client terminals of a plurality of users, client terminals of the first subset being located in proximity to a geographic location of a real-life event at a time of the real-life event;
- identifying a second subset of the plurality of client terminals associated with users potentially interested in the real-life event;
- sending a message to each client terminal of the first subset of client terminals, the message containing a request, to present on a respective display of the client terminal, to acquire media content documenting the real-life event in the geographic location, the request comprising instructions for imaging the real-life event; and
- in response to a given client terminal of the first subset of client terminals accepting the request, establishing a chat between the given client terminal and at least one client terminal of the second subset of client terminals.

* * * * *